US012701301B2

(12) United States Patent (10) Patent No.: US 12,701,301 B2
Li (45) Date of Patent: Aug. 4, 2026

(54) INTERACTION METHOD AND APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventor: Xingge Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/875,644

(22) PCT Filed: Aug. 14, 2023

(86) PCT No.: PCT/CN2023/112810
§ 371 (c)(1),
(2) Date: Dec. 16, 2024

(87) PCT Pub. No.: WO2024/037480
PCT Pub. Date: Feb. 22, 2024

(65) Prior Publication Data
US 2026/0025559 A1 Jan. 22, 2026

(30) Foreign Application Priority Data
Aug. 15, 2022 (CN) .......................... 202210977564.5

(51) Int. Cl.
*H04N 21/488* (2011.01)
*H04N 21/2387* (2011.01)
(52) U.S. Cl.
CPC ..... *H04N 21/4884* (2013.01); *H04N 21/2387* (2013.01)

(58) Field of Classification Search
CPC ....................... H04N 21/4884; H04N 21/2387
(Continued)

(56) References Cited

U.S. PATENT DOCUMENTS

2009/0210778 A1* 8/2009 Kulas ................. H04N 21/4788
715/201
2018/0053510 A1* 2/2018 Kofman ................. G11B 27/34
2018/0268870 A1 9/2018 Chen et al.

FOREIGN PATENT DOCUMENTS

CN 106126535 A 11/2016
CN 108962220 A 12/2018
(Continued)

OTHER PUBLICATIONS

International Patent Application No. PCT/CN2023/112810; Int'l Search Report; dated Oct. 17, 2023; 3 pages.
(Continued)

*Primary Examiner* — John W Miller
*Assistant Examiner* — Omer Khalid
(74) *Attorney, Agent, or Firm* — BakerHostetler

(57) ABSTRACT

The present disclosure relates to an interaction method, an apparatus, an electronic device and a storage medium. The method comprises: receiving a text display operation for a first media content, wherein the first media content includes a video content; in response to the text display operation, displaying in a preset region a list of text sentences of the first media content, wherein the list of text sentences contains at least two text sentences, and the at least two text sentences each have a corresponding audio sentence in target audio data of the first media content.

20 Claims, 9 Drawing Sheets

(58) Field of Classification Search
USPC ......................................................... 348/564
See application file for complete search history.

(56)                References Cited

FOREIGN PATENT DOCUMENTS

| | | | |
|---|---|---|---|
| CN | 109246472 | A | 1/2019 |
| CN | 109634700 | A | 4/2019 |
| CN | 111970257 | A | 11/2020 |
| CN | 113903021 | A | 1/2022 |
| CN | 115269920 | A | 11/2022 |
| JP | 2003-018491 | A | 1/2003 |
| JP | 2009-152753 | A | 7/2009 |
| JP | 2009-218741 | A | 9/2009 |
| JP | 2019-512174 | A | 5/2019 |
| WO | 2022068533 | A1 | 4/2022 |
| WO | WO 2022/132168 | A1 | 6/2022 |

OTHER PUBLICATIONS

First Office Action for Chinese Application No. 202210977564.5, mailed Apr. 12, 2025, 14 pages.
Japan Patent Application No. 2024-571844; Notice of Reasons for Refusal; dated Dec. 16, 2025; 11 pages.

* cited by examiner

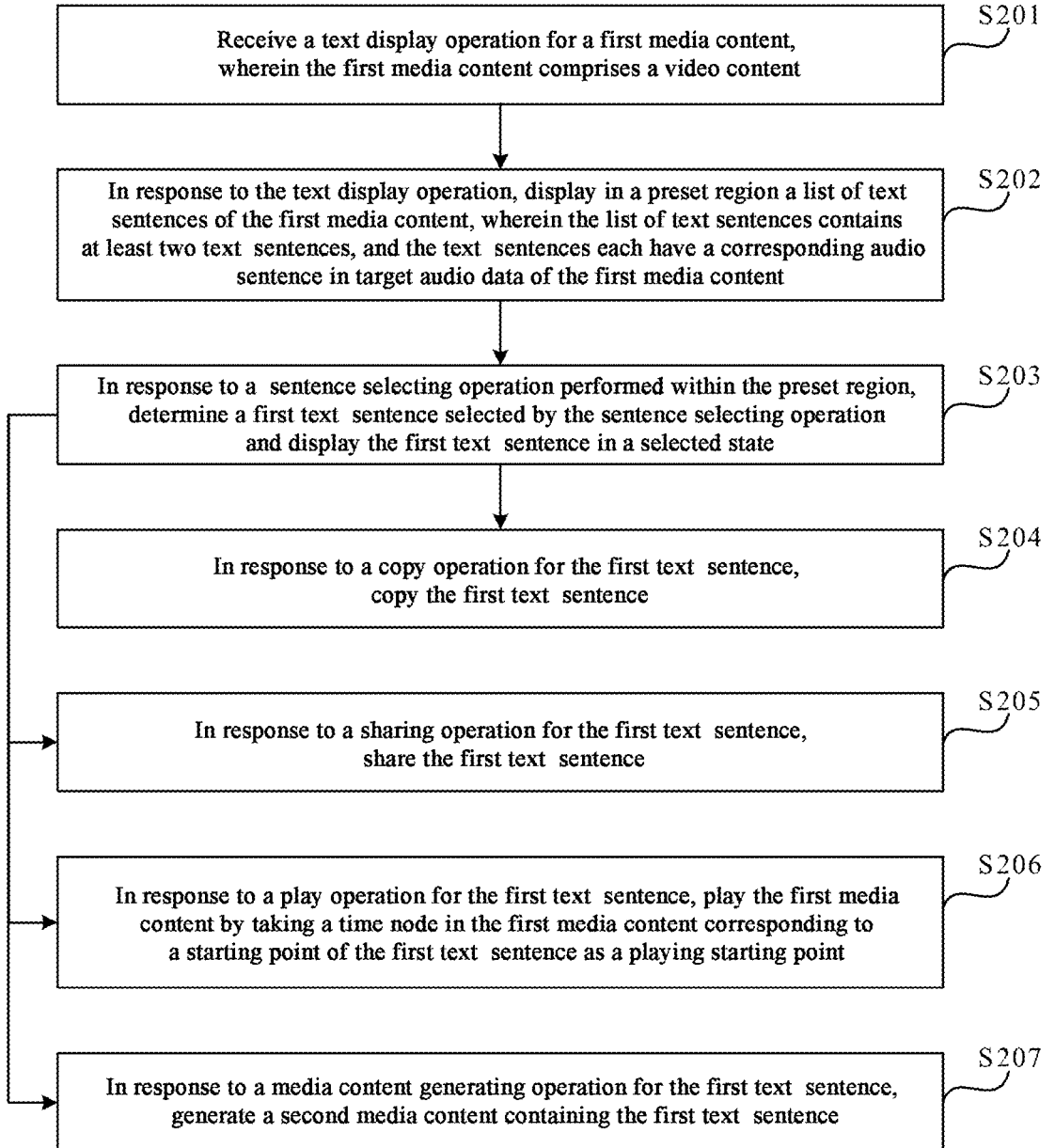

Receive a text display operation for a first media content, wherein the first media content comprises a video content
S201

In response to the text display operation, display in a preset region a list of text sentences of the first media content, wherein the list of text sentences contains at least two text sentences, and the text sentences each have a corresponding audio sentence in target audio data of the first media content
S202

In response to a sentence selecting operation performed within the preset region, determine a first text sentence selected by the sentence selecting operation and display the first text sentence in a selected state
S203

In response to a copy operation for the first text sentence, copy the first text sentence
S204

In response to a sharing operation for the first text sentence, share the first text sentence
S205

In response to a play operation for the first text sentence, play the first media content by taking a time node in the first media content corresponding to a starting point of the first text sentence as a playing starting point
S206

In response to a media content generating operation for the first text sentence, generate a second media content containing the first text sentence
S207

Fig. 6

Second media content

80

Post

901

902

Operation receiving module

List displaying module

INTERACTION METHOD AND APPARATUS, ELECTRONIC DEVICE, AND STORAGE MEDIUM

CROSS-REFERENCE TO RELATED APPLICATION(S)

The present application is a national stage application filed under 35 U.S.C. 371 based on International Patent Application No. PCT/CN2023/112810, filed Aug. 14, 2023, which claims the priority right of the Chinese patent application filed with the China Intellectual Property Administration on Aug. 15, 2022, having the application No. 202210977564.5. The disclosures of these patent applications are incorporated herein by reference in their entireties.

FIELD

The present disclosure relates to the field of computer technology, and more specifically, to an interaction method and apparatus, an electronic device and a storage medium.

BACKGROUND

Users may obtain valuable information in video sounds through listening. However, the method for obtaining valuable information in the video sounds is relatively simple and the efficiency of information acquisition is also low.

SUMMARY

The present disclosure provides an interaction method and apparatus, an electronic device and a storage medium, to provide diversified methods for obtaining valuable information in video sounds and enhance the efficiency for obtaining valuable information in video sounds.

Embodiments of the present disclosure provide an interaction method, comprising:

receiving a text display operation for a first media content, wherein the first media content comprises a video content;

in response to the text display operation, displaying in a preset region a list of text sentences of the first media content, wherein the list of text sentences contains at least two text sentences, and the at least two text sentences each have a corresponding audio sentence in target audio data of the first media content.

Embodiments of the present disclosure also provide an interaction apparatus, comprising:

an operation receiving module configured to receive a text display operation for a first media content, wherein the first media content comprises a video content;

a list display module configured to, in response to the text display operation, display in a preset region a list of text sentences of the first media content, wherein the list of text sentences contains at least two text sentences, and the at least two text sentences each have a corresponding audio sentence in target audio data of the first media content.

Embodiments of the present disclosure also provide an electronic device, comprising:

one or more processors; and a memory configured to store one or more programs;

wherein the one or more programs, when executed by the one or more processors, cause the one or more processors to implement the interaction method according to the embodiments of the present disclosure.

Embodiments of the present disclosure also provide a computer readable storage medium stored thereon with computer programs which, when executed by a processor, performing the interaction method according to the embodiments of the present disclosure.

BRIEF DESCRIPTION OF THE DRAWINGS

FIG. 6 illustrates a schematic diagram of a further interaction method provided by embodiments of the present disclosure:

DETAILED DESCRIPTION OF EMBODIMENTS

Figure 1:
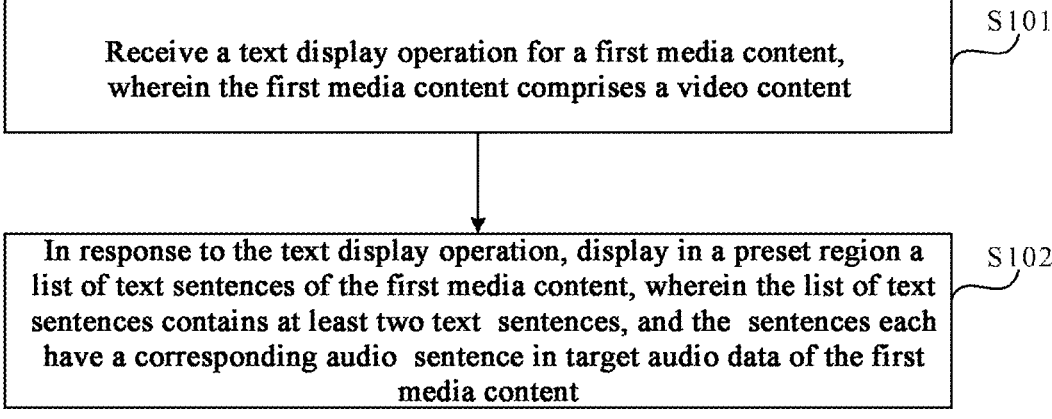
FIG. 1 illustrates a schematic flowchart of an interaction method provided by embodiments of the present disclosure.

Embodiments of the present disclosure will be described below with reference to the drawings. Although the drawings illustrate some embodiments of the present disclosure, the present disclosure can be implemented in various manners and should not be limited to the embodiments explained herein. On the contrary, the embodiments are provided to understand the present disclosure. The drawings and the embodiments of the present disclosure are provided only for exemplary purpose, rather than restricting the protection scope of the present disclosure.

Steps disclosed in the method implementations of the present disclosure may be executed in different orders and/or in parallel. Besides, the method implementations may include additional steps and/or omit the demonstrated steps. The scope of the present disclosure is not restricted in this regard.

As used herein, the term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." The term "some embodiments" is to be read as "at least some embodiments". Related definitions of other terms may be provided in the following description.

The terms "first" and "second" are disclosed in the present disclosure merely for distinguishing different apparatuses, modules or units, rather than restricting the sequence or interdependence of the functions executed by the apparatuses, modules or units.

The terms "one" and "more" disclosed in the present disclosure are exemplary rather than restrictive. The above terms are to be read as "one or more" unless indicated otherwise in the context.

Names of the messages or information exchanged between a plurality of apparatuses in the implementations of the present disclosure are provided only for explanatory purpose, rather than restricting the scope of the messages or information.

Prior to the use of the technical solutions disclosed by various embodiments of the present disclosure, type, usage scope and application scenario of personal information involved in the present disclosure are made known to users through suitable ways in accordance with the relevant laws and regulations, to obtain user authorization.

For example, in response to receiving an active request from the users, a prompt message is sent to the users to clearly inform them that the operation to be executed per request needs to obtain and use their personal information. Accordingly, the users may voluntarily select, in accordance with the prompt message, whether to provide their personal information to software or hardware that performs operations of the technical solution, such as an electronic device, an application program, a server or a storage medium.

As an optional and non-restrictive implementation, in response to receiving an active request from the users, a prompt message is sent to the users, wherein the prompt message may be present in the form of pop-up window as an example and the prompt message may be displayed in text in the pop-up window. Besides, the pop-up window also may be provided with a select control through which the users may choose to "agree" or "disagree" the provision of personal information to the electronic device.

The above procedure for informing the users and obtaining the user authorization is only exemplary and does not restrict the implementations of the present disclosure. Other methods may also be applied to the implementations of the present disclosure as long as they comply with relevant regulations and laws.

FIG. 1 illustrates a schematic flowchart of an interaction method provided by embodiments of the present disclosure. The method may be executed by an interaction apparatus, wherein the apparatus may be implemented by a software and/or a hardware and configured in an electronic device, e.g., in a mobile phone or a tablet computer. The interaction method provided by the embodiments of the present disclosure is adapted to view scenarios of a list of text sentences of a video. For example, the method is adapted to view scenarios of a list of text sentences of a video while watching videos. As shown in FIG. 1, the interaction method provided by the embodiment may include the following steps.

S101: receiving a text display operation for a first media content, wherein the first media content comprises a video content.

Wherein the text display operation may be a trigger operation for displaying a list of text sentences of a media content, such as an operation of triggering a text display control of one media content, an operation of triggering a media content jump control of other media contents (such as third media content) generated based on text sentences in one media content, or other gesture operations indicating display of the list of text sentences of the media content etc. The first media content may be a media content used by the text display operation to indicate display of a list of text sentences of the first media content, wherein the media content, for example, may be video content or image-text content. The types of the media content are not restricted in the embodiments. Optionally, the first media content may be a video content including audio data (like human voices) apart from the background music. The following explanation is provided by taking the first media content as an example of the video content.

As an example, the text display operation for the first media content may be received. For instance, an operation of triggering the text display control of the first media content by the user is received while the first media content is being displayed: or in case of displaying other media contents generated based on the text sentences in the first media content, a media content jump operation executed by the user is received, e.g., an operation of triggering a media content jump control corresponding to a third media content by the user is received.

S102: in response to the text display operation, displaying in a preset region a list of text sentences of the first media content, wherein the list of text sentences contains at least two text sentences, and the text sentences each have a corresponding audio sentence in target audio data of the first media content.

Wherein the preset region may be a region for displaying the list of text sentences of the first media content, and the position and the size of the preset region may be flexibly configured according to the requirements. The target audio data may be audio data of the first media content, such as human voice data (like valid human voice data) in the audio data of the first media content apart from the background music.

The list of text sentences may be a list for displaying text sentences corresponding to at least one audio sentence in the target audio data of the first media content. The list of text sentences may include text sentences corresponding to audio sentences in the target audio data. e.g., text sentences in one-to-one correspondence with audio sentences in the target audio data. In case that the target audio data contain at least two audio sentences, the list of text sentences may include at least two text sentences. If the target audio data include only one audio sentence, the list of text sentences may also only contain one text sentence. Each list of text sentences may be arranged according to a sequence of audio sentences in the target audio data corresponding to the list of text sentences.

Text sentences in the list of text sentences may be identified by a publisher of the first media content by listening to the target audio data and input by the publisher. For example, the text sentences may be obtained through speech recognition of the target audio data. After the first media content is successfully posted, the speech recognition may be performed on the target audio data of the first media content to obtain the list of text sentences of the first media content. The text sentences in the list of text sentences may be divided based on preset punctuations in the list of text sentences. For instance, the content between two adjacent preset punctuations in the list of text sentences may be considered as one text sentence. The preset punctuations may be configured according to the requirements. The preset punctuations, for example, may include comma, semicolon and full stop etc.

The display of the list of text sentences is independent of whether the first media content includes a subtitle. In other words, when the first media content includes a subtitle, the list of text sentences of the first media content may be displayed. For instance, the list of text sentences of the first media content is displayed while the first media content and the current playing subtitle of the first media content are being displayed. Even if the first media content does not include a subtitle, the list of text sentences of the first media content may also be displayed. The list of text sentences mentioned in the embodiments is different from the subtitle. When the subtitle is to be presented, a subtitle corresponding to the currently playing audio sentence is presented alone, rather than all subtitle contents of the video content. However, the list of text sentences presented by the embodiments may include a text sentence corresponding to at least one audio sentence in the target audio data. Accordingly, the user may not only view the currently playing text sentence through the list of text sentences, but also view the already played text sentences and the text sentences not played yet through the list of text sentences.

Figure 2:
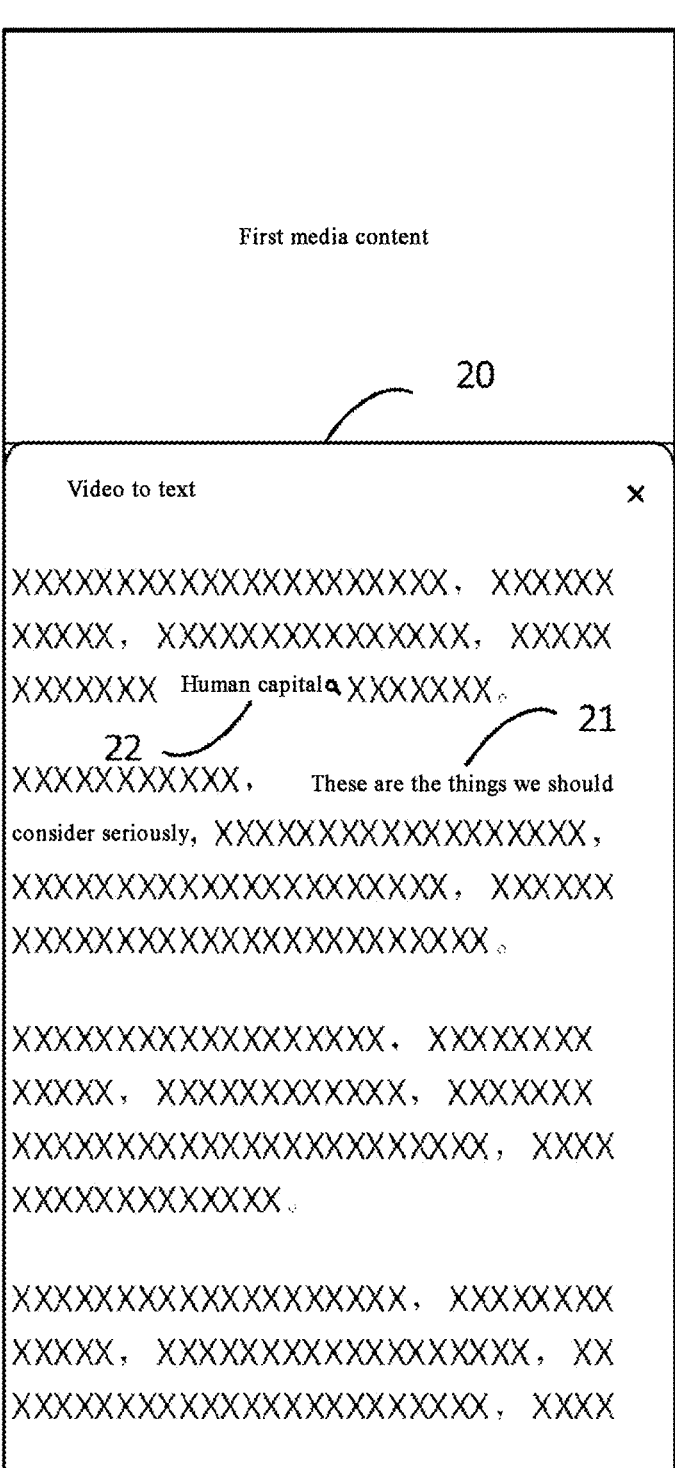
FIG. 2 illustrates a schematic diagram of display of a list of text sentences provided by embodiments of the present disclosure.

As an example, upon receipt of the text display operation for the first media content, the list of text sentences 20 of the first media content may be displayed in the preset region according to FIG. 2. The list of text sentences 20 of the first media content may be displayed while the first media content is being played. For instance, the first media content is played in a media content play region of a media content display page, and the list of text sentences 20 of the first media content is displayed in the preset region of the media content display page. Here, the media content play region and the preset region may overlap or not and the embodiments are not restricted in this regard.

Besides, when the list of text sentences of the first media content is displayed in the preset region, a preset interactive control of the first media content also may be displayed in the preset region. For example, a publisher identifier (e.g., profile photo) of the first media content, and a Like control, a comment control, a Favorite control or a sharing control of the first media content are displayed in the preset region. Accordingly, the user may view a personal homepage of the publisher of the first media content by triggering the publisher identifier of the first media content, give a thumbs up to the first media content by triggering the Like control, view the comment information of the first media content or comment the first media content by triggering the comment control to indicate the current application to display a comment panel of the first media content, add the first media content into a favorite list by triggering the Favorite control or share the first media content by triggering the sharing control to indicate the current application to display a sharing panel of the first media content. In case that the user does not want to view the list of text sentences of the first media content, the user may indicate the current application to stop displaying the list of text sentences of the first media content through a corresponding triggering operation. The triggering operation, for example, may include triggering a close control displayed in the preset region, clicking the media content play region and/or continuing to swipe down if a first text sentence in the list of text sentences is displayed in the preset region etc.

In the embodiments, the display of the list of text sentences of the video content allows the user to obtain the information in the video (such as video sound) through viewing the list of text sentences of the video content in addition to obtaining the information in the video by watching the video pictures or listening to the video sounds. Accordingly, the user still can quickly obtain the information contained in the video sound when it is inconvenient to listen to the video sound, for example it is inconvenient to turn on the video sound, or the environment is quite noisy or a hearing damage exists. Compared to the technical solution in which the user obtains the information contained in the video only by watching video pictures or listening to the video sounds in the related art, the method according to the present disclosure can obtain the information in the video (e.g., video sound) in a more diversified way, improve the efficiency for obtaining information in the video and enhance the user experience.

In the embodiments, continuing to refer to FIG. 2, when the list of text sentences 20 of the first media content is displayed, a current text sentence 21 (such as "these are the things we should consider seriously" shown in FIG. 2) in the list of text sentences 20 is automatically moved to the preset region for display. The current text sentence 21 and other text sentences in the list of text sentences 20 apart from the current text sentence 21 may be displayed in different ways, e.g., in different fonts, word sizes and/or colors etc., to facilitate the user to confirm and view the current text sentence.

At this moment, optionally, the at least two text sentences include a current text sentence and other text sentences apart from the current text sentence, and the current text sentence has a different display style from the other text sentences, where the current text sentence is a currently playing text sentence.

Wherein the current text sentence may be a text sentence corresponding to the currently playing audio sentence in the target audio data of the first media content. With the playing of the first media content, the current text sentence may change.

In the embodiments, when a keyword to be searched 22 is included, the keyword to be searched 22 and the content in the list of text sentences 20 apart from the keyword to be searched 22 may be displayed in different display styles in the list of text sentences 20. For example, the keyword to be searched 22 and the content in the list of text sentences 20 apart from the keyword to be searched 22 may be displayed in different fonts, word sizes and/or colors etc. For example, a search mark (such as a magnifying glass mark displayed at the upper right corner of the keyword to be searched "human capital" in FIG. 2) may be added to the keyword to be searched 22 to facilitate the user to determine the keyword to be searched 22 in the list of text sentences 20 and perform a quick search.

At this moment, optionally, a keyword to be searched contained in the at least two text sentences and other contents in the at least two text sentences apart from the keyword to be searched have different display styles, the keyword to be searched being provided for triggering display of a search result matching with a triggered keyword to be searched.

Wherein the keyword to be searched may be determined based on a preset determination rule. For example, a candidate keyword may be pre-labeled manually, and/or the candidate keyword may be determined in advance according to search frequency of a plurality of keywords in the current application and/or by a candidate keyword determination model; and a candidate keyword contained in at least one text sentence of the list of text sentences of the first media content acts as a keyword to be searched in the list of text sentences.

Therefore, when it is detected that the user triggers a keyword to be searched in the list of text sentences, a search result matching with the keyword to be searched may be obtained and displayed. For example, a search result matching with the keyword to be searched is obtained from a server and the search result is displayed in the current page (e.g., preset region). Alternatively, the current page is switched to a search result page from the media content display page and the search result is displayed in the search result page etc.

In one implementation, in case of changes of the currently playing sentence, the display position and/or display style of the currently playing sentence in the preset region may be automatically adjusted before and after the change. For example, before a change occurs to the currently playing sentence, the currently playing sentence before the change may be displayed in a first display style at a set position of the preset region and the sentences other than the currently playing sentence in the list of text sentences is displayed in a second display style. In case of changes of the currently playing sentence, at least one text sentence (including the currently playing sentence before the change) in the list of text sentences may be controlled to move, so as to move the changed currently playing sentence to the set position of the preset region for display; and the currently playing sentence before the change is switched from the first display style to the second display style, and the changed currently playing sentence is switched from the second display style to the first display style. At this point, optionally, the current text sentence is displayed at a set position of the preset region, and the method for interactions provided by the embodiments further comprises: in case of changes of the current text sentence, moving a changed current text sentence to the set position for display:

In one implementation, after the displaying in a preset region a list of text sentences of the first media content, the method also comprises: in response to a sentence switching operation performed within the preset region, switching a text sentence displayed in the preset region and displaying a position control, wherein the position control is provided to trigger movement of the current text sentence to a set position of the preset region for display.

Wherein the sentence switching operation may be a trigger operation for switching the text sentence displayed in the preset region, such as an operation for triggering a text sentence switching control or a swiping operation performed within the preset region etc. The position control may be a control for triggering the movement of the current text sentence to the set position of the preset region for display. The position control may be displayed immediately upon receipt of the sentence switching operation, and also may be displayed when the sentence switching operation is received and the currently playing sentence is not displayed in the preset region. The position control may be configured according to the requirements.

Figure 3:
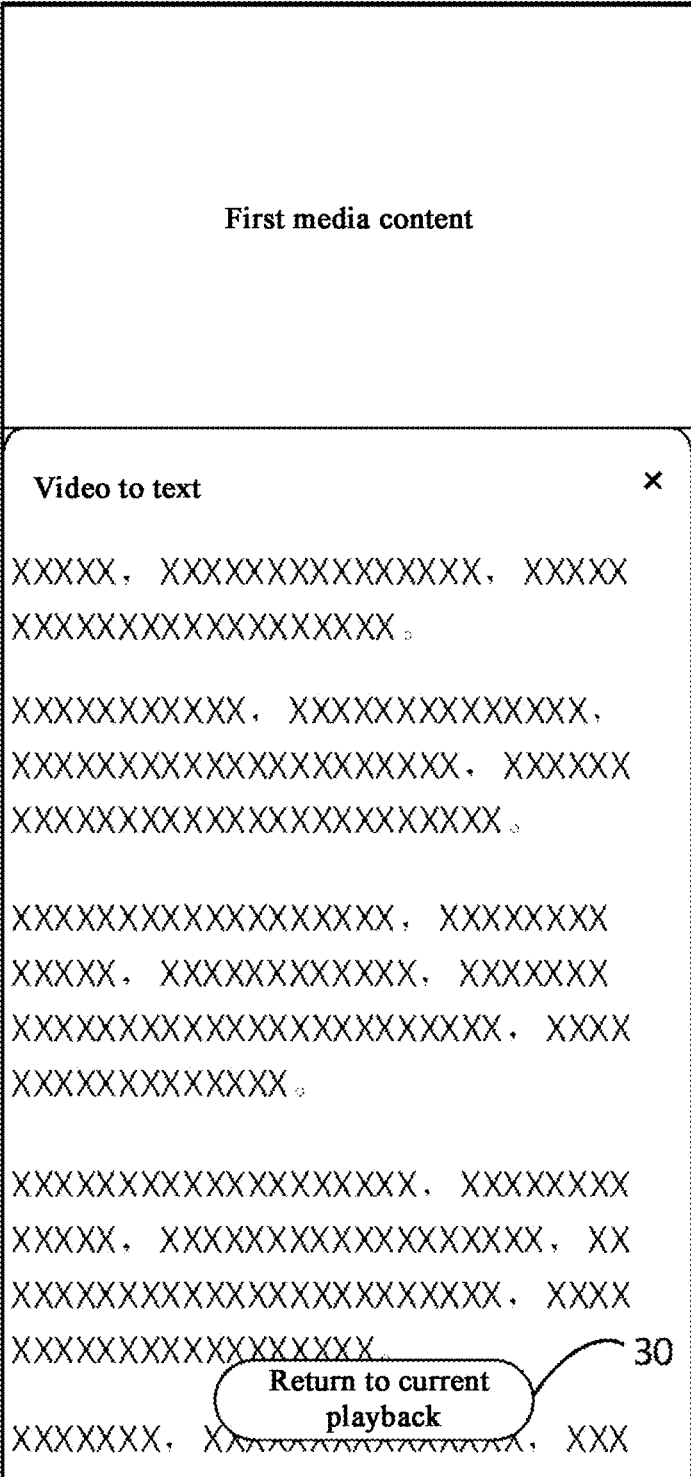
FIG. 3 illustrates a schematic diagram of display of a position control provided by embodiments of the present disclosure.

As an example, upon receipt of the sentence switching operation, e.g., when it is detected that the user swipes vertically within the preset region, the text sentence displayed in the preset region may be switched. For example, at least one text sentence displayed in the preset region is controlled to move along with the swiping direction of the user, to move the text sentence not displayed in the preset region into the preset region for display; and the position control 30 is displayed when the sentence switching operation is received and/or the currently playing sentence is not displayed within the preset region as shown in FIG. 3. Therefore, when intending to view the currently playing sentence, the user may trigger the position control 30. Correspondingly, when the current application detects that the user triggers the position control 30, multiple text sentences displayed in the preset region may be controlled to move, so as to move the currently playing sentence to the set position of the present region for display.

In the above implementation, after the sentence switching operation is received, the currently playing sentence after the change can still be automatically moved to the set position of the preset region for display in case of changes of the currently playing sentence.

As an example, after the sentence switching operation is received, the currently playing sentence after the change is no longer automatically moved to the set position of the preset region for display, to satisfy the needs of the user for viewing the text sentence displayed in the preset region after the switching. At this moment, when it is detected that the user triggers the position control, or when a trigger operation for switching the play progress of the first media content is received (e.g., receiving an operation of playing one text sentence in the list of text sentences), the method may resume to automatically move the changed currently playing sentence to the set position of the preset region for display, i.e., the changed currently playing sentence is automatically moved to the set position of the preset region for display in case of changes of the currently playing sentence.

In one implementation, before the receiving a text display operation for a first media content, the method also comprises: playing the first media content: the displaying in a preset region a list of text sentences of the first media content includes: displaying in the preset region a list of text sentences of the first media content, and adjusting the first media content to be played outside the preset region.

In the above implementation, the user may execute the text display operation for the first media content while viewing the first media content.

Figure 4:
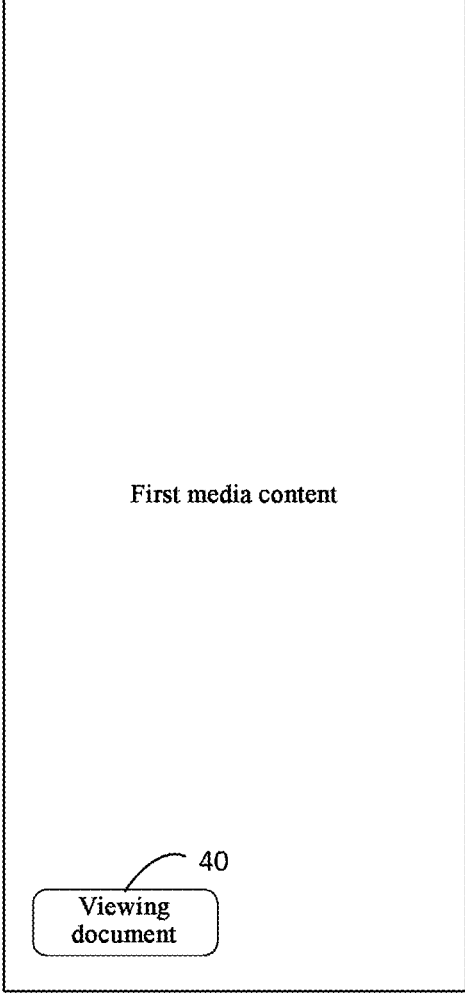
FIG. 4 illustrates a schematic diagram of display of a text display control provided by embodiments of the present disclosure.

As shown in FIG. 4, the current application may play the first media content in the media content play region of the media content display page. Accordingly, when the user intends to view the list of text sentences 20 of the first media content, the user may execute the text display operation for the first media content, such as triggering the text display control 40 of the first media content. Correspondingly, upon receiving the text display operation for the first media content, the current application may display the list of text sentences 20 of the first media content in the preset region of the media content display page and adjust a display range of the media content play region in accordance with a display range of the preset region, so as to adjust the first media content to be played outside the preset region as shown in FIG. 2.

Wherein the display position of the text display control 40 may be flexibly configured. For example, when the first media content is displayed, the text display control 40 of the first media content may be displayed at the preset position of the media content display page as shown in FIG. 4: the text display control 40 may also be displayed in the preset panel of the first media content. Therefore, when the user intends to execute the text display operation, the user may directly trigger the text display control 40 in the first media content; or perform a panel display operation to indicate the current application to display the preset panel of the first media content and trigger the text display control 40 displayed in the preset panel.

Besides, the text display operation for the first media content also may include a mute play operation for the first media content. For example, when it is detected that the user adjusts a playing volume of the first media content to mute, it is determined that the text display operation for the first media content is received. The list of text sentences of the first media content is displayed in the preset region of the media content display page and the first media content is adjusted to be played outside the preset region, to facilitate the user to obtain the information in the target audio data of the first media content.

In a further implementation, the text display operation includes a media content jump operation for a third media content: before the receiving a text display operation for a first media content, the method also comprises: playing the third media content, wherein the third media content is a media content generated based on a second text sentence in the first media content: the displaying in a preset region a list of text sentences of the first media content includes: playing the first media content outside the preset region and displaying a list of text sentences of the first media content in the preset region.

In the above implementation, the user may execute the text display operation for the first media content while watching the third media content generated based on the first media content.

Wherein the third media content may be a media content generated based on the second text sentence in the first media content, e.g., the media content generated via the media content generating operation for the second text sentence. The third media content may be video content or image-text content etc. The second text sentence may include one or more text sentences in the list of text sentences of the first media content and may be the same as or different from the first text sentence. The third media content may be a media content posted by the current user or other users watching the first media content. The media content jump operation may be a trigger operation for indicating to jump to an original media content (e.g., first media content) corresponding to the currently playing media content (such as third media content). For example, in case that the currently playing media content is a media content generated based on the text sentences in a further media content, the media content jump operation may be an operation of triggering a jump to the further media content, e.g., an operation of triggering a media content jump control of the currently playing media content etc.

Figure 5:
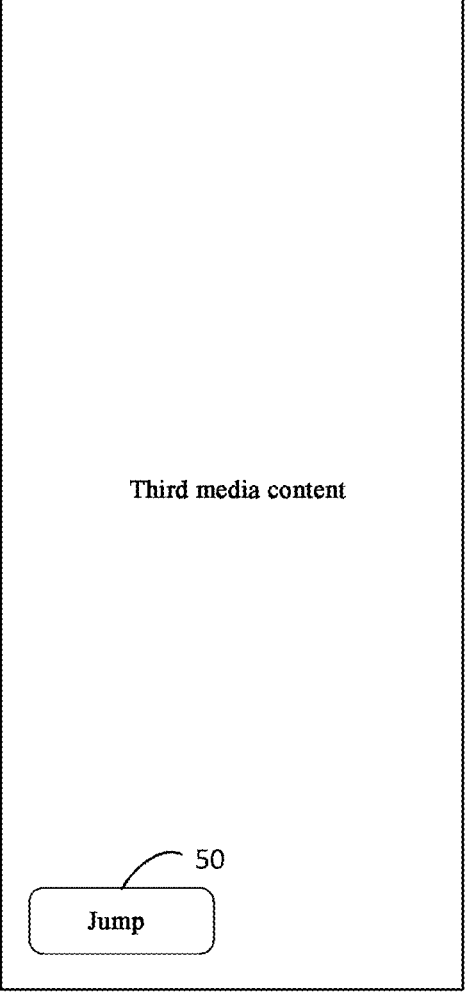
FIG. 5 illustrates a schematic diagram of display of a media content jump control provided by embodiments of the present disclosure.

As shown in FIG. 5, the current application may display the third media content generated based on the second text sentence in the first media content. In this way, when the user intends to view the first media content and/or the list of text sentences of the first media content, the user may perform the text display operation for the first media content, e.g., triggering a media content jump control 50 corresponding to the third media content. Correspondingly, upon receiving the text display operation for the first media content, the current application may play the first media content outside the preset region and display the list of text sentences 20 of the first media content in the preset region as shown in FIG. 2. For example, the current page may be switched to the media content display page of the first media content, the first media content may be played outside the preset region of the media content display page, and the list of text sentences 20 of the first media content may be displayed in the preset region of the media content display page.

In the above implementation, the timing for display the media content jump control corresponding to the third media content may be flexibly configured. For example, when third media content is being displayed, the media content jump control corresponding to the third media content is also displayed. Besides, the media content jump control corresponding to the third media content may also be displayed when the control display operation for the third media content is received. At this moment, optionally, before the receiving a text display operation for a first media content, the method also comprises: in response to a control display operation for the third media content, displaying a media content jump control corresponding to the third media content, wherein the jump control is provided for triggering execution of the media content jump operation. Wherein the control display operation for the third media content may be a trigger operation for indicating to display the media content jump control corresponding to the third media content, e.g., a pause display operation for the third media content. As an example, when the pause display operation for the third media content is received, the display of the third media content may be paused and the media content jump control corresponding to the third media is displayed.

In the above implementation, the playing the first media content outside the preset region may include: playing the first media content outside the preset region by taking a starting point of the first media content as a playing starting point: or playing the first media content outside the preset region by taking a time node in the first media content corresponding to a starting point of the second text sentence as a playing starting point. In other words, when the first media content is played outside the preset region in response to the media content jump operation for the third media content, the first media content may be played from its starting point as the playing starting point, or the first media content is played by taking a time node in the first media content corresponding to the starting point of the second text sentence as the playing starting point. The playing starting point may be configured according to the requirements.

The interaction method provided by the embodiments comprises receiving a text display operation for a first media content, wherein the first media content includes a video content; and in response to the text display operation, displaying in a preset region a list of text sentences of the first media content, wherein the list of text sentences contains at least two text sentences, and the text sentences each have a corresponding audio sentence in target audio data of the first media content. By using the above technical solution, the embodiments display the list of text sentences of the video content, such that the user may obtain the information in the video (such as video sound) through viewing the list of text sentences of the video content in addition to obtaining the information in the video by watching the video pictures or listening to the video sounds. Therefore, the information in the video can be obtained in a more diversified way, the efficiency for obtaining information in the video is improved and the user experience is enhanced.

FIG. 6 illustrates a schematic flowchart of a further interaction method provided by embodiments of the present disclosure. The solution in these embodiments may be combined with one or more optional solution in the above embodiments. Optionally, after the displaying in a preset region a list of text sentences of the first media content, the method also comprises: in response to a sentence selecting operation performed within the preset region, determining a first text sentence selected by the text selecting operation and executing at least one of: in response to a copy operation for the first text sentence, copying the first text sentence; in response to a sharing operation for the first text sentence, sharing the first text sentence: in response to a play operation for the first text sentence, playing the first media content by taking a time node in the first media content corresponding to a starting point of the first text sentence as a playing starting point: in response to a media content generating operation for the first text sentence, generating a second media content containing the first text sentence.

Optionally, after the determining a first text sentence selected by the sentence selecting operation, the method further comprises: displaying the first text sentence in a selected state.

Correspondingly, as shown in FIG. 6, the interaction method provided by the embodiments may include the following steps.

S201: receiving a text display operation for a first media content, wherein the first media content includes a video content.

S202: in response to the text display operation, displaying in a preset region a list of text sentences of the first media content, wherein the list of text sentences contains at least two text sentences, and the text sentences each have a corresponding audio sentence in target audio data of the first media content.

S203: in response to a sentence selecting operation performed within the preset region, determining a first text sentence selected by the text selecting operation, displaying the first text sentence in a selected state and executing at least one of S204-S207.

Wherein the sentence selecting operation may be an operation of selecting one or more text sentences in the list of text sentences of the first media content, such as a clicking operation in the preset region. The first text sentence may be the text sentence selected by the sentence selecting operation and the first text sentence may include one or more text sentences.

As an example, when the sentence selecting operation performed in the preset region is received, the first text sentence selected by the sentence selecting operation may be determined. The first text sentence is displayed in the selected state and a copy control 70, a sharing control (not shown in FIG. 7), a play control 71 and/or a media content generating control 72 corresponding to the first text sentence may be displayed as demonstrated in FIG. 7.

As an example, when a clicking operation performed in the preset region is received, the text sentence displayed at a trigger position of the clicking operation may serve as the first text sentence corresponding to the clicking operation. The first text sentence is displayed in the selected state, and the copy control, the sharing control, the play control and/or the media content generating control corresponding to the first text sentence are displayed. Besides, the user may adjust the selected range by adjusting the position of the starting point identifier and/or the position of the ending point identifier of the selected first text sentence, so as to adjust the contents contained in the first text sentence.

S204: in response to a copy operation for the first text sentence, copying the first text sentence.

Figure 7:
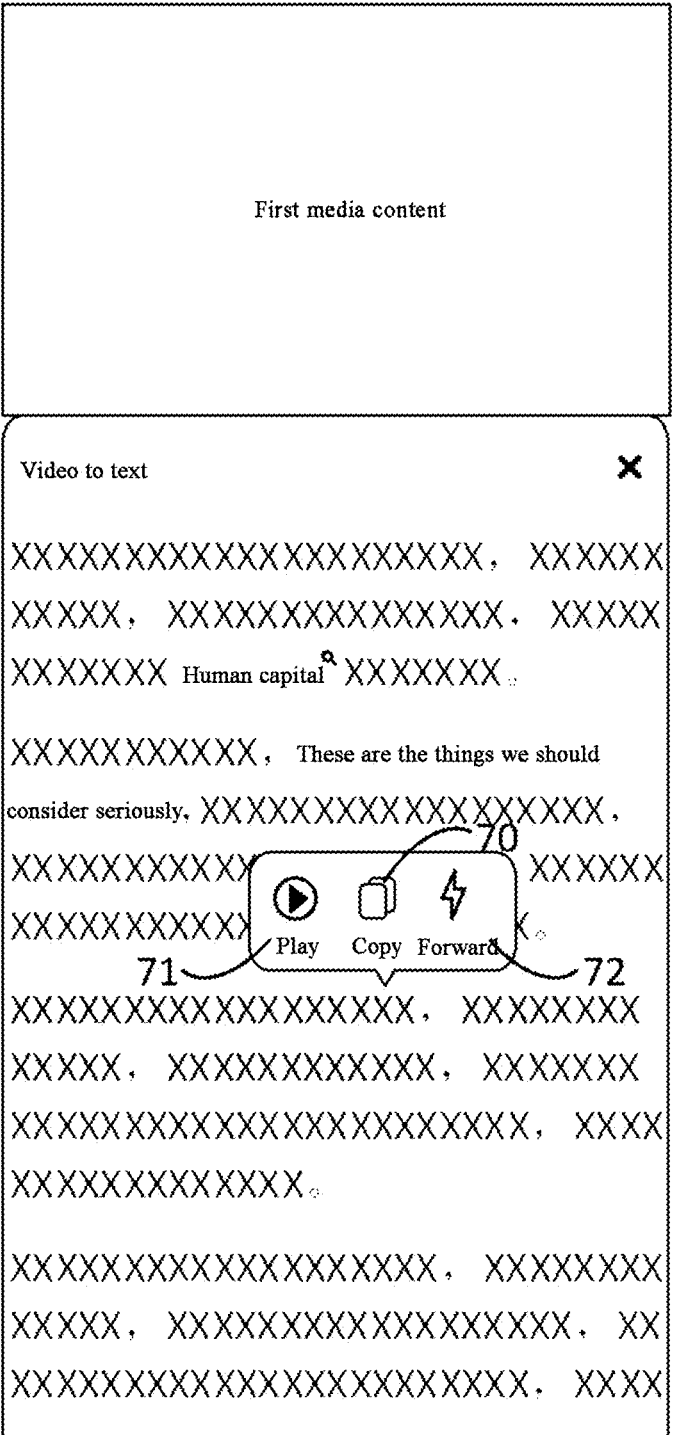
FIG. 7 illustrates a schematic diagram of display of a first text sentence provided by embodiments of the present disclosure.

As an example, when a copy operation for the first text sentence is received, the first text sentence may be copied and a prompt message may be displayed to prompt the user that the first text sentence is successfully copied. Afterwards, the user may input the first text sentence into other pages of the current application or other applications by pasting, wherein the copy operation for the first text sentence may be a trigger operation for indicating to copy the first text sentence, such as an operation of triggering a copy control 70 (as shown in FIG. 7) corresponding to the first text sentence.

S205: in response to a sharing operation for the first text sentence, sharing the first text sentence.

As an example, when a sharing operation for the first text sentence is received, the first text sentence may be shared. For example, a sharing panel is displayed for the current users to select other users with whom they intend to share the first text sentence; and when the current users finish the selection, the first text sentence is shared to other users selected by the current users: or the first text sentence is directly shared to the target user having a preset association with the current users. Wherein the copy operation for the first text sentence may be a trigger operation for indicating to display the sharing panel to share the first text sentence or a trigger operation for indicating to share the first text sentence, for example, an operation of triggering a sharing control corresponding to the first text sentence etc.

S206: in response to a play operation for the first text sentence, playing the first media content by taking a time node in the first media content corresponding to a starting point of the first text sentence as a playing starting point.

As an example, when a play operation for the first text sentence is received, the play progress of the first media content may be adjusted to the play progress indicated by a time node in the first media content corresponding to the starting point of the first text sentence. That is, the first media content may be played by taking a time node in the first media content corresponding to the starting point of the first text sentence as the playing starting point, so as to facilitate the user to listen to the audio sentence corresponding to the first text sentence. Wherein the play operation for the first text sentence may be a trigger operation for indicating to play the audio sentence corresponding to the first text sentence, e.g., an operation of triggering a play control 71 (as shown in FIG. 7) corresponding to the first text sentence. 30

S207: in response to a media content generating operation for the first text sentence, generating a second media content containing the first text sentence.

Wherein the media content generating operation for the first text sentence may be a trigger operation for indicating to generate the new media content from the first text sentence, such as an operation of triggering the media content generating control 72 (as shown in FIG. 7) corresponding to the first text sentence. The second media content may be a media content generated using the first text sentence. The second media content may be a video content or an image-text content etc. The image-text content may be appreciated as a media content in which the image serves as the content and the text is the introduction information of the media content.

As an example, when a media content generating operation for the first text sentence is received, the second media content containing the first text sentence may be generated.

Where the image-text content is taken as the example of the second media content, a card containing the second text sentence may be generated when the second media content including the first text sentence is generated. The second media content is generated based on using the card as the content of the media content and using the music corresponding to the second text sentence and/or the card as the background music of the media content. Optionally, the generating a second media content containing the first text sentence includes: generating a target card containing the first text sentence: generating the second media content by using the target card as content and using music corresponding to the first text sentence and/or the target card as background music.

The target card may be a picture containing the first text sentence. The music corresponding to the first text sentence/ target card may serve as the music associated with the first text sentence/target card. The music associated with a plurality of text sentences/cards may be determined by a pre-trained model or pre-configured. The target card may be determined randomly or selected from a plurality of precon-figured cards based on the first text sentence. Different cards may have various display styles. The embodiments are not restricted in this regard.

In the embodiments, once the media content generating operation for the first text sentence is received, the second media content including the first text sentence is generated without considering the length of the first text sentence. The length of the first text sentence may also be considered. The second media content including the first text sentence is generated upon receipt of the media content generating operation for the first text sentence only when the length of the first text sentence is within a preset length range (e.g., less than 150 words). However, where the length of the first text sentence is outside the preset length range, the second media content is not generated based on the first text sentence. For example, in case that the length of the first text sentence is outside the preset length range, the media content generating control corresponding to the first text sentence is not displayed. This may be configured flexibly according to the requirements.

In the embodiments, a recreation may be made based on the text sentences in the list of text sentences of the first media content, to generate a new media content. Thus, a new method for creating media contents is provided, the diffi-culty for creating media contents is lowered and the creative experience of the user is enhanced.

In one implementation, the second media content con-taining the first text sentence may be generated and posted in response to the media content generating operation for the first text sentence. For example, the media content generat-ing operation may be a trigger operation for indicating to generate and post the second media content. The media content generating operation may include a posting opera-tion for the second media content including the first text sentence. Therefore, when the media content generating operation for the first text sentence is received, the second media content including the first text sentence may be generated and the second media content is posted. Option-ally, the generating a second media content containing the first text sentence includes: generating a second media content containing the first text sentence and posting the second media content.

Figure 8:
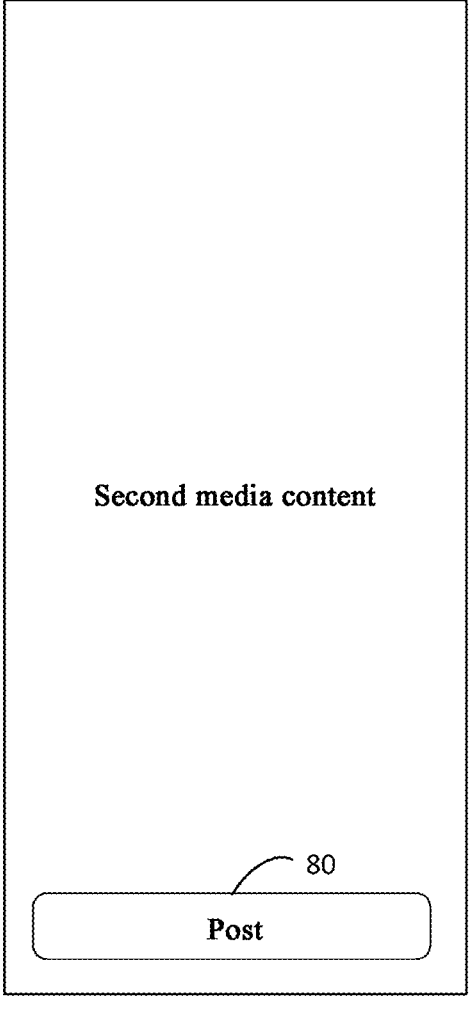
FIG. 8 illustrates a schematic diagram of an editing page of a second media content provided by embodiments of the present disclosure.

In another implementation, upon receipt of the media content generating operation for the first text sentence, only the second media content including the first text sentence is generated; and when a posting operation for the second media content is received, the second media content is posted. For example, when the media content generating operation for the first text sentence is received, the second media content including the first text sentence is generated and an editing page of the second media content is displayed as shown in FIG. 8, to allow the user to edit the second media content; and the second media content is posted when the posting operation (e.g., an operation of triggering a posting control 80 in the editing page of the second media content) performed on the editing page of the second media content or the posting operation performed in a posting page of the second media content is received. At this point, optionally, after the generating a second media content containing the first text sentence, the method further com-prises: in response to a posting operation for the second media content, posting the second media content.

Display of the list of text sentences of the first media content and recreation based on the text sentences in the list of text sentences of the first media content are carried out under the authorization of the publisher of the first media content. For example, the publisher of the first media content may turn on or turn off the display of authorization or recreation authorization for the list of text sentences of all media contents (including the first media content) posted by the publisher in the setting page, or the publisher may turn on or off the display of authorization or recreation authori-zation for the list of text sentences of the first media content in the setting panel of the first media content. Besides, if the publisher of the first media content does not authorize to display the list of text sentences of the first media content, the list of text sentences of the first media content will not be displayed in response to the text display operation by the user: if the publisher of the first media content does not authorize a recreation based on the text sentences in the list of text sentences of the first media content, no response is made to the media content generating operation of the user for the text sentences in the list of text sentences of the first media content.

The method for interactions provided by the embodiments may support the user to copy, share and/or play the text sentences displayed in the list of text sentences, or to create new media contents based on the text sentences displayed in the list of text sentences, so as to satisfy the different needs of the users, lower the difficulty for creating media contents and enhance the user experience.

Figure 9:
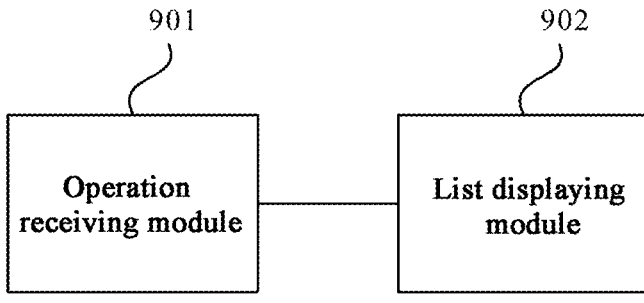
FIG. 9 illustrates a structural diagram of an interaction apparatus provided by the embodiments of the present disclosure.

FIG. 9 illustrates a structural diagram of an interaction apparatus provided by embodiments of the present disclo-sure. The apparatus may be implemented by software and/or hardware and may be configured in an electronic device, such as mobile phone or tablet computer. The apparatus may display the list of text sentences of the video through executing the method for interactions. As shown in FIG. 9, the interaction apparatus provided by the embodiments may include: an operation receiving module 901 and a list display module 902.

The operation receiving module 901 is configured to receive a text display operation for a first media content, wherein the first media content includes a video content:

The list display module 902 is configured to, in response to the text display operation, display in a preset region a list of text sentences of the first media content, wherein the list of text sentences contains at least two text sentences, and the text sentences each have a corresponding audio sentence in target audio data of the first media content.

The interaction apparatus provided by the embodiments comprises receiving, through the operation receiving mod-ule 901, a text display operation for a first media content, wherein the first media content includes a video content; and displaying in a preset region a list of text sentences of the first media content through the list display module 902, in response to the text display operation, wherein the list of text sentences contains at least two text sentences, and the text sentences each have a corresponding audio sentence in target audio data of the first media content. By using the above technical solution, the embodiments display the list of text sentences of the video content, so as to obtain the information in the video (such as video sound) through viewing the list of text sentences of the video content in addition to obtaining the information in the video by watch-ing the video pictures or listening to the video sounds. Therefore, the information in the video can be obtained in a more diversified way, the efficiency for obtaining informa-tion in the video is improved and the user experience is enhanced.

In the above solutions, the at least two text sentences include a current text sentence and other text sentences apart from the current text sentence, and the current text sentence has a different display style from the other text sentences, where the current text sentence is a currently playing text sentence.

In the above solutions, the current text sentence may be displayed at a set position of the preset region, and the interaction apparatus by the embodiments also may comprise: a sentence moving module configured to, when the current text sentence changes, move a changed current text sentence to the set position for display.

As an example, the interaction apparatus provided by the embodiments also may comprise: a sentence switching module configured to, after the displaying in a preset region a list of text sentences of the first media content, switch a text sentence displayed in the preset region and display a position control in response to a sentence switching operation performed within the preset region, wherein the position control is provided to trigger movement of the current text sentence to a set position of the preset region for display.

As an example, the interaction apparatus provided by the embodiments also may comprise: a sentence selecting module configured to, after the displaying in a preset region a list of text sentences of the first media content, determine a first text sentence selected by the text selecting operation in response to a sentence selecting operation performed within the preset region, and call at least one of the following modules: a sentence copying module configured to, in response to a copy operation for the first text sentence, copy the first text sentence: a sentence sharing module configured to, in response to a sharing operation for the first text sentence, share the first text sentence: a sentence playing module configured to, in response to a play operation for the first text sentence, play the first media content by taking a time node in the first media content corresponding to a starting point of the first text sentence as a playing starting point; and a media content generating module configured to, in response to a media content generating operation for the first text sentence, generate a second media content containing the first text sentence.

In the above solutions, the media content generating module may include: a card generating unit configured to generate a target card containing the first text sentence; and a media content generating unit configured to generate the second media content by using the target card as content and using music corresponding to the first text sentence and/or the target card as background music.

In the above solutions, the media content generating module may be configured to: generate a second media content containing the first text sentence and post the second media content: or the interaction apparatus provided by the embodiments also may comprise: a media content posting module configured to, after the generating a second media content containing the first text sentence, post the second media content in response to a posting operation for the second media content.

In the above solutions, the sentence selecting module may also be configured to: display the first text sentence in a selected state after the determining a first text sentence selected by the sentence selecting operation.

In the above solutions, a keyword to be searched contained in the at least two text sentences and other contents in the at least two text sentences apart from the keyword to be searched have different display styles, the keyword to be searched being provided for triggering display of a search result matching with a triggered keyword to be searched.

As an example, the apparatus for interactions provided by the embodiments also may comprise: a first playing module configured to, before receiving a text display operation for a first media content, play the first media content: the list display module 902 may be configured to: display in the preset region a list of text sentences of the first media content, and adjust the first media content to be played outside the preset region.

In the above solutions, the text display operation may include a media content jump operation for a third media content: the apparatus for interactions provided by the embodiments also may include: a second playing module configured to, before the receiving a text display operation for a first media content, play a third media content, wherein the third media content is a media content generated based on a second text sentence in the first media content: the list display module 902 may be configured to: play the first media content outside the preset region and display a list of text sentences of the first media content in the preset region.

As an example, the interaction apparatus provided by the embodiments also may include: a control display module configured to, before the receiving a text display operation for a first media content, display a jump control corresponding to the third media content in response to a control display operation for the third media content, wherein the jump control is provided for triggering execution of the media content jump operation.

In the above solutions, the list display module 902 may be configured to: play the first media content outside the preset region by taking a starting point of the first media content as a playing starting point: or play the first media content outside the preset region by taking a time node in the first media content corresponding to a starting point of the second text sentence as a playing starting point.

The apparatus for interactions provided by the embodiments of the present disclosure may execute the method for interactions provided by any embodiments of the present disclosure, have corresponding functional modules for performing the method for interactions and achieve the corresponding effects. The technical details not elaborated in the embodiments may refer to the method for interactions provided by any embodiments of the present disclosure.

Figure 10:
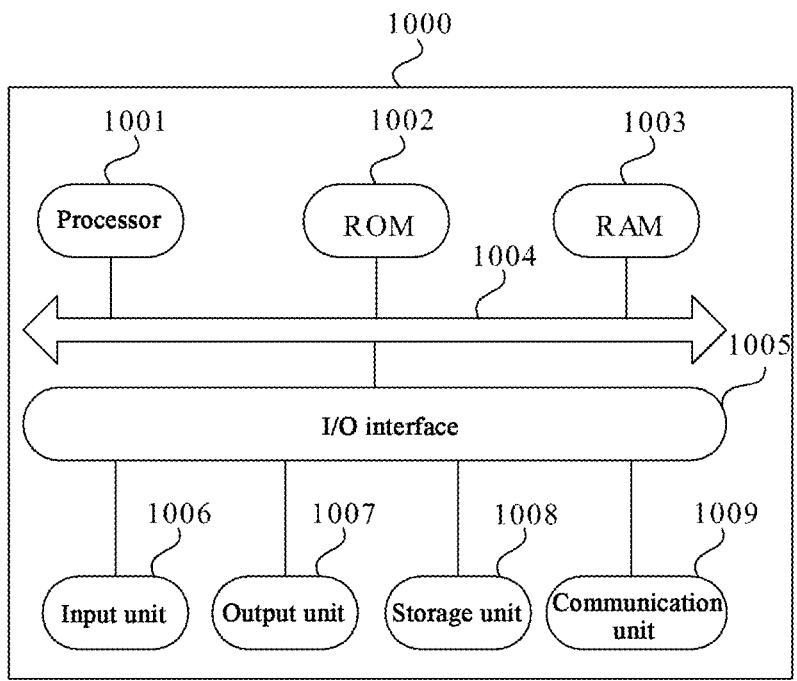
FIG. 10 illustrates a structural diagram of an electronic device provided by the embodiments of the present disclosure.

Next, FIG. 10 illustrates a structural diagram of an electronic device (such as terminal device) 1000 adapted to implement embodiments of the present disclosure. In the embodiments of the present disclosure, the terminal device may include mobile terminals, such as mobile phones, notebooks, digital broadcast receivers, Personal Digital Assistants (PDAs), Portable Android Devices (PADs), Portable Multimedia Players (PMPs) and vehicle 30) terminals (such as car navigation terminal) and fixed terminals, e.g., digital TVs and desktop computers etc. The electronic device shown in FIG. 10 is just an example and will not put any restrictions on the functions and application ranges of the embodiments of the present disclosure.

According to FIG. 10, the electronic device 1000 may include a processor (e.g., central processor, graphic processor and the like) 1001, which can execute various suitable actions and processing based on the programs stored in the Read-Only Memory (ROM) 1002 or programs loaded in the Random-Access Memory (RAM) 1003 from a storage unit 1008. The RAM 1003 can also store all kinds of programs and data required by the operations of the electronic device 1000. Processor 1001, ROM 1002 and RAM 1003 are connected to each other via a bus 1004. The input/output (I/O) interface 1005 is also connected to the bus 1004.

Input unit 1006 (including touch screen, touchpad, keyboard, mouse, camera, microphone, accelerometer, gyroscope and like) and output unit 1007 (including liquid crystal display (LCD), speaker and vibrator etc.), storage unit 1008 (including tape and hard disk etc.) and communication unit 1009 may be connected to the I/O interface 1005. The communication unit 1009 may allow the electronic device 1000 to exchange data with other devices through wired or wireless communications. Although FIG. 10 illustrates the electronic device 1000 having various units, it is not a prerequisite to implement or provide all illustrated units. Alternatively, more or less units may be implemented or provided.

In accordance with embodiments of the present disclosure, the process depicted above with reference to the flowchart may be implemented as computer software programs. For example, the embodiments of the present disclosure include a computer program product including computer programs carried on a non-transient computer readable medium, wherein the computer programs include program codes for executing the method demonstrated by the flowchart. In these embodiments, the computer programs may be loaded and installed from networks via the communication unit 1009, or installed from the storage unit 1008, or installed from the ROM 1002. The computer programs, when executed by the processor 1001, performs the above functions defined in the method for video editing according to the embodiments of the present disclosure.

The above disclosed computer readable medium may be computer readable signal medium or computer readable storage medium or any combinations thereof. The computer readable storage medium for example may include, but not limited to, electric, magnetic, optical, electromagnetic, infrared or semiconductor systems, apparatus or devices or any combinations thereof. The computer readable storage medium may include electrical connection having one or more wires, portable computer disk, hard disk, RAM, ROM. Erasable Programmable Read Only Memory (EPROM), flash memory; fiber optics, portable compact disk read only memory (CD-ROM), optical storage device, magnetic storage device, or any suitable combinations thereof. In the present disclosure, the computer readable storage medium may be any tangible medium that contains or stores programs. The programs may be utilized by instruction execution systems, apparatuses or devices in combination with the same. In the present disclosure, the computer readable signal medium may include a data signal propagated in baseband or as part of a carrier wave, carrying computer readable program codes therein. Such propagated data signals may take many forms, including but not limited to, electromagnetic signals, optical signals, or any suitable combinations thereof. The computer readable signal medium may also be any computer readable medium in addition to the computer readable storage medium. The computer readable signal medium may send, propagate, or transmit programs for use by or in connection with instruction execution systems, apparatuses or devices. Program codes contained on the computer readable medium may be transmitted by any suitable media, including: electric wires, fiber optic cables and Radio Frequency (RF) etc., or any suitable combinations thereof.

In some implementations, clients and servers may communicate with each other via any currently known or to be developed network protocols, such as HyperText Transfer Protocol (HTTP) and interconnect with digital data communications in any forms or media (such as communication networks). Examples of the communication networks include Local Area Network (LAN), Wide Area Network (WAN), internet work (e.g., Internet) and end-to-end network (such as ad hoc end-to-end network), and any currently known or to be developed networks.

The above computer readable medium may be included in the aforementioned electronic device or stand-alone without fitting into the electronic device.

The above computer readable medium bears one or more programs. When the above one or more programs are executed by the electronic device, the electronic device is enabled to: receive a text display operation for a first media content, wherein the first media content includes a video content: in response to the text display operation, display in a preset region a list of text sentences of the first media content, wherein the list of text sentences contains at least two text sentences, the at least two text sentences each having a corresponding audio sentence in target audio data of the first media content.

Computer program instructions for executing operations of the present disclosure may be written in one or more programming languages or combinations thereof. The above programming languages include object-oriented programming languages, e.g., Java, Smalltalk, C++ and so on, and traditional procedural programming languages, such as "C" language or similar programming languages. The program codes can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider).

The flow chart and block diagram in the drawings illustrate system architecture, functions and operations that may be implemented by system, method and computer program product according to various implementations of the present disclosure. In this regard, each block in the flow chart or block diagram can represent a module, a part of program segment or code, wherein the module and the part of program segment or code include one or more executable instruction for performing stipulated logic functions. In some alternative implementations, the functions indicated in the block can also take place in an order different from the one indicated in the drawings. For example, two successive blocks can be in fact executed in parallel or sometimes in a reverse order dependent on the involved functions. Each block in the block diagram and/or flow chart and combinations of the blocks in the block diagram and/or flow chart can be implemented by a hardware-based system exclusive for executing stipulated functions or actions, or by a combination of dedicated hardware and computer instructions.

Units described in the embodiments of the present disclosure may be implemented by software as well as hardware, wherein the name of the module does not restrict the unit per se under one condition.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In the context of the present disclosure, machine readable medium may be tangible medium that may include or store programs for use by or in connection with instruction execution systems, apparatuses or devices. The machine readable medium may be machine readable signal medium or machine readable storage medium. The machine readable storage medium for example may include electric, magnetic, optical, electromagnetic, infrared or semiconductor systems, apparatus or devices or any combinations thereof. The machine readable storage medium may include, but not limited to, electrical connection having one or more wires, portable computer disk, hard disk, RAM, ROM, EPROM, flash memory, fiber optics, portable CD-ROM, optical storage device, magnetic storage device, or any suitable combinations thereof. The storage medium may be non-transitory.

In accordance with one or more embodiments of the present disclosure, Example 1 provides an interaction method, comprising:

receiving a text display operation for a first media content, wherein the first media content includes a video content;

in response to the text display operation, displaying in a preset region a list of text sentences of the first media content, wherein the list of text sentences contains at least two text sentences, and the text sentences each have a corresponding audio sentence in target audio data of the first media content.

In accordance with one or more embodiments of the present disclosure, Example 2 is directed to a method according to Example 1, wherein the at least two text sentences include a current text sentence and other text sentences apart from the current text sentence, and the current text sentence has a different display style from the other text sentences, where the current text sentence is a currently playing text sentence.

In accordance with one or more embodiments of the present disclosure, Example 3 is directed to a method according to Example 2, wherein the current text sentence is displayed at a set position of the preset region, and the method further comprises:

in a case that the current text sentence changes, moving a changed current text sentence to the set position for display.

In accordance with one or more embodiments of the present disclosure, Example 4 is directed to a method according to Example 2, wherein after the displaying in a preset region a list of text sentences of the first media content, the method also comprises:

in response to a sentence switching operation performed within the preset region, switching a text sentence displayed in the preset region and displaying a position control, wherein the position control is provided to trigger movement of the current text sentence to a set position of the preset region for display.

In accordance with one or more embodiments of the present disclosure, Example 5 is directed to a method according to Example 1, wherein after displaying in a preset region a list of text sentences of the first media content, the method also comprises:

in response to a sentence selecting operation performed within the preset region, determining a first text sentence selected by the text selecting operation and executing at least one of:

in response to a copy operation for the first text sentence, copying the first text sentence;

in response to a sharing operation for the first text sentence, sharing the first text sentence;

in response to a play operation for the first text sentence, playing the first media content by taking a time node in the first media content corresponding to a starting point of the first text sentence as a playing starting point;

in response to a media content generating operation for the first text sentence, generating a second media content containing the first text sentence.

In accordance with one or more embodiments of the present disclosure, Example 6 is directed to a method according to Example 5, wherein the generating a second media content containing the first text sentence includes:

generating a target card containing the first text sentence;

generating the second media content by using the target card as content and using music corresponding to the first text sentence or the target card as background music.

In accordance with one or more embodiments of the present disclosure, Example 7 is directed to a method according to Example 5, wherein the generating a second media content containing the first text sentence includes: generating a second media content containing the first text sentence and posting the second media content: or, after the generating a second media content containing the first text sentence, the method further comprises: in response to a posting operation for the second media content, posting the second media content.

In accordance with one or more embodiments of the present disclosure, Example 8 is directed to a method according to Example 5, wherein after the determining a first text sentence selected by the text selecting operation, the method further comprises:

displaying the first text sentence in a selected state.

In accordance with one or more embodiments of the present disclosure, Example 9 is directed to a method according to Example 1, wherein a keyword to be searched contained in the at least two text sentences and other contents in the at least two text sentences apart from the keyword to be searched have different display styles, the keyword to be searched being provided for triggering display of a search result matching with a triggered keyword to be searched.

In accordance with one or more embodiments of the present disclosure, Example 10 is directed to a method according to any of Examples 1-9, wherein before the receiving a text display operation for a first media content, the method also comprises:

playing the first media content;

the displaying in a preset region a list of text sentences of the first media content includes:

displaying in the preset region a list of text sentences of the first media content, and adjusting the first media content to be played outside the preset region.

In accordance with one or more embodiments of the present disclosure, Example 11 is directed to a method according to any of Examples 1-9, wherein the text display operation includes a media content jump operation for a third media content: before the receiving a text display operation for a first media content, the method also comprises:

playing the third media content, wherein the third media content is a media content generated based on a second text sentence in the first media content; and wherein the displaying in a preset region a list of text sentences of the first media content includes:

playing the first media content outside the preset region and displaying a list of text sentences of the first media content in the preset region.

In accordance with one or more embodiments of the present disclosure, Example 12 is directed to a method according to Example 11, wherein before the receiving a text display operation for a first media content, the method also comprises:

in response to a control display operation for the third media content, displaying a jump control corresponding to the third media content, wherein the jump control is provided for triggering execution of the media content jump operation.

In accordance with one or more embodiments of the present disclosure, Example 13 is directed to a method according to Example 11, wherein the playing the first media content outside the preset region includes:

playing the first media content outside the preset region by taking a starting point of the first media content as a playing starting point: or playing the first media content outside the preset region by taking a time node in the first media content corresponding to a starting point of the second text sentence as a playing starting point.

In accordance with one or more embodiments of the present disclosure, Example 14 provides an interaction apparatus, comprising:

an operation receiving module configured to receive a text display operation for a first media content, wherein the first media content includes a video content;

a list display module configured to, in response to the text display operation, display in a preset region a list of text sentences of the first media content, wherein the list of text sentences contains at least two text sentences, and the at least two text sentences each have a corresponding audio sentence in target audio data of the first media content.

In accordance with one or more embodiments of the present disclosure, Example 15 provides an electronic device, comprising:

one or more processors; and a memory configured to store one or more programs;

wherein the one or more programs, when executed by the one or more processors, cause the one or more processors to implement the interaction method according to any of claims 1-13.

In accordance with one or more embodiments of the present disclosure, Example 16 provides a computer readable storage medium stored thereon with computer programs which, when executed by a processor, performing the method for interactions according to any of claims 1-13.

Furthermore, although the respective operations are depicted in a particular order, it should be appreciated that the operations are not required to be completed in the particular order or in succession. In some cases, multitasking or multiprocessing is also beneficial. Likewise, although the above discussion comprises some particular implementation details, they should not be interpreted as limitations over the scope of the present disclosure. Some features described separately in the context of the embodiments of the description can also be integrated and implemented in a single embodiment. Conversely, all kinds of features described in the context of a single embodiment can also be separately implemented in multiple embodiments or any suitable sub-combinations.

Although the subject matter is already described by languages specific to structural features and/or method logic acts, it is to be appreciated that the subject matter defined in the attached claims is not limited to the above described particular features or acts. On the contrary, the above described particular features and acts are only example forms for implementing the claims.

I claim:

1. An interaction method, comprising:

receiving a text display operation for a first media content, wherein the first media content comprises a video content;

in response to the text display operation, displaying in a preset region a list of text sentences of the first media content, wherein the list of text sentences contains at least two text sentences, and the at least two text sentences each have a corresponding audio sentence in target audio data of the first media content; and in response to a sentence selecting operation performed within the preset region, determining a first text sentence selected by the sentence selecting operation and executing at least one of:

in response to a copy operation for the first text sentence, copying the first text sentence, in response to a sharing operation for the first text sentence, sharing the first text sentence, in response to a play operation for the first text sentence, playing the first media content by taking a time node in the first media content corresponding to a starting point of the first text sentence as a playing starting point, or in response to a media content generating operation for the first text sentence, generating a second media content containing the first text sentence.

2. The method of claim 1, wherein the at least two text sentences comprise a current text sentence and other text sentence apart from the current text sentence, and the current text sentence has a different display style from the other text sentence, and wherein the current text sentence is a text sentence currently being played.

3. The method of claim 2, wherein the current text sentence is displayed at a set position of the preset region, and the method further comprises:

in a case that the current text sentence changes, moving the changed current text sentence to the set position for display.

4. The method of claim 2, wherein after the displaying in a preset region a list of text sentences of the first media content, the method further comprises:

in response to a sentence switching operation performed within the preset region, switching a text sentence displayed in the preset region and displaying a position control, wherein the position control is provided to trigger movement of the current text sentence to a set position of the preset region for display.

5. The method of claim 1, wherein the generating a second media content containing the first text sentence comprises:

generating a target card containing the first text sentence; and generating the second media content by using the target card as content and using music corresponding to at least one of the first text sentence or the target card as background music.

6. The method of claim 1, wherein the generating a second media content containing the first text sentence comprises:

generating a second media content containing the first text sentence and posting the second media content; or wherein, after the generating a second media content containing the first text sentence, the method further comprises: in response to a posting operation for the second media content, posting the second media content.

7. The method of claim 1, wherein after the determining a first text sentence selected by the sentence selecting operation, the method further comprises:

displaying the first text sentence in a selected state.

8. The method of claim 1, wherein a keyword to be searched contained in the at least two text sentences and other contents in the at least two text sentences apart from the keyword to be searched have different display styles, and the keyword to be searched is provided for triggering display of a search result matching with a triggered keyword to be searched.

9. The method of claim 1, wherein before the receiving a text display operation for a first media content, the method further comprises:

playing the first media content; and wherein the displaying in a preset region a list of text sentences of the first media content comprises:

displaying in the preset region a list of text sentences of the first media content, and adjusting the first media content to be played outside the preset region.

10. The method of claim 1, wherein the text display operation comprises a media content jump operation for a third media content; and before the receiving a text display operation for a first media content, the method further comprises:

playing the third media content, wherein the third media content is a media content generated based on a second text sentence in the first media content; and wherein the displaying in a preset region a list of text sentences of the first media content comprises:

playing the first media content outside the preset region and displaying a list of text sentences of the first media content in the preset region.

11. The method of claim 10, wherein before the receiving a text display operation for a first media content, the method further comprises:

in response to a control display operation for the third media content, displaying a jump control corresponding to the third media content, wherein the jump control is provided for triggering execution of the media content jump operation.

12. The method of claim 10, wherein the playing the first media content outside the preset region comprises:

playing the first media content outside the preset region by taking a starting point of the first media content as a playing starting point; or playing the first media content outside the preset region by taking a time node in the first media content corresponding to a starting point of the second text sentence as a playing starting point.

13. An electronic device, comprising:

at least one processor; and a memory communicatively connected to the at least one processor; wherein, the memory is stored with a computer program executable by the at least one processor, wherein the computer program is executed by the at least one processor to cause the at least one processor to perform operations comprising:

receiving a text display operation for a first media content, wherein the first media content comprises a video content;

in response to the text display operation, displaying in a preset region a list of text sentences of the first media content, wherein the list of text sentences contains at least two text sentences, and the at least two text sentences each have a corresponding audio sentence in target audio data of the first media content; and in response to a sentence selecting operation performed within the preset region, determining a first text sentence selected by the sentence selecting operation and executing at least one of:

in response to a copy operation for the first text sentence, copying the first text sentence, in response to a sharing operation for the first text sentence, sharing the first text sentence, in response to a play operation for the first text sentence, playing the first media content by taking a time node in the first media content corresponding to a starting point of the first text sentence as a playing starting point, or in response to a media content generating operation for the first text sentence, generating a second media content containing the first text sentence.

14. A non-transitory computer-readable storage medium stored thereon with computer instructions, the computer instructions enabling a processor to perform operations comprising:

receiving a text display operation for a first media content, wherein the first media content comprises a video content;

in response to the text display operation, displaying in a preset region a list of text sentences of the first media content, wherein the list of text sentences contains at least two text sentences, and the at least two text sentences each have a corresponding audio sentence in target audio data of the first media content; and in response to a sentence selecting operation performed within the preset region, determining a first text sentence selected by the sentence selecting operation and executing at least one of:

in response to a copy operation for the first text sentence, copying the first text sentence, in response to a sharing operation for the first text sentence, sharing the first text sentence, in response to a play operation for the first text sentence, playing the first media content by taking a time node in the first media content corresponding to a starting point of the first text sentence as a playing starting point, or in response to a media content generating operation for the first text sentence, generating a second media content containing the first text sentence.

15. The electronic device of claim 13, wherein the at least two text sentences comprise a current text sentence and other text sentence apart from the current text sentence, and the current text sentence has a different display style from the other text sentence, and wherein the current text sentence is a text sentence currently being played.

16. The electronic device of claim 15, wherein the current text sentence is displayed at a set position of the preset region, and the operations further comprise:

in a case that the current text sentence changes, moving the changed current text sentence to the set position for display.

17. The electronic device of claim 15, wherein after the displaying in a preset region a list of text sentences of the first media content, the operations further comprise:

in response to a sentence switching operation performed within the preset region, switching a text sentence displayed in the preset region and displaying a position control, wherein the position control is provided to trigger movement of the current text sentence to a set position of the preset region for display.

18. The electronic device of claim 13, wherein the generating a second media content containing the first text sentence comprises:

generating a target card containing the first text sentence; and generating the second media content by using the target card as content and using music corresponding to at least one of the first text sentence or the target card as background music.

19. The non-transitory computer-readable storage medium of claim 14, wherein the at least two text sentences comprise a current text sentence and other text sentence apart from the current text sentence, and the current text sentence has a different display style from the other text sentence, and wherein the current text sentence is a text sentence currently being played.

20. The non-transitory computer-readable storage medium of claim 14, the operations further comprising:

playing the first media content before receiving the text display operation for the first media content; and adjusting to play the first media content outside the preset region while displaying the list of text sentences of the first media content in the preset region.

* * * * *